United States Patent
Tu

(10) Patent No.: US 12,314,190 B2
(45) Date of Patent: May 27, 2025

(54) MICRO-CONTROLLER CHIP AND ACCESS METHOD THEREOF

(71) Applicant: Nuvoton Technology Corporation, Hsinchu Science Park (TW)

(72) Inventor: Yu-Hui Tu, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 377 days.

(21) Appl. No.: 17/994,030

(22) Filed: Nov. 25, 2022

(65) Prior Publication Data
US 2023/0214331 A1 Jul. 6, 2023

(30) Foreign Application Priority Data
Dec. 30, 2021 (TW) .................................. 110149548

(51) Int. Cl.
*G06F 12/14* (2006.01)
*G06F 9/4401* (2018.01)

(52) U.S. Cl.
CPC ........ *G06F 12/1408* (2013.01); *G06F 9/4403* (2013.01); *G06F 2212/1052* (2013.01)

(58) Field of Classification Search
CPC ............... G06F 12/1408; G06F 9/4403; G06F 2212/1052; G06F 12/1433; Y02D 10/00
See application file for complete search history.

(56) References Cited

U.S. PATENT DOCUMENTS

| | | | |
|---|---|---|---|
| 6,938,162 B1 * | 8/2005 | Nagai | G11B 20/00268 |
| 7,913,307 B2 * | 3/2011 | Esaka | G06F 21/79 |
| | | | 713/193 |
| 2015/0330456 A1 * | 11/2015 | Bodtker | F16D 3/42 |
| | | | 464/125 |

FOREIGN PATENT DOCUMENTS

| | | |
|---|---|---|
| TW | 460768 B | 10/2001 |
| TW | I274282 B | 2/2007 |
| TW | 201617899 A | 5/2016 |
| WO | WO 2020/073072 A1 | 4/2020 |

* cited by examiner

*Primary Examiner* — Abiy Getachew
(74) *Attorney, Agent, or Firm* — Muncy, Geissler, Olds & Lowe, P.C.

(57) ABSTRACT

A micro-controller chip is coupled to an external memory and includes a central processing unit (CPU), an address reorder circuit, and an address bus. The CPU is configured to provide a first internal address. The address reorder circuit calculates a unique identifier and a seed code to generate a base parameter and performs a reorder operation for the first internal address according to the base parameter to generate a first encryption address. The address bus is coupled between the address reorder circuit and the external memory to provide the first encryption address to the external memory. The external memory stores specific data according to the first encryption address.

20 Claims, 4 Drawing Sheets

MICRO-CONTROLLER CHIP AND ACCESS METHOD THEREOF

CROSS REFERENCE TO RELATED APPLICATIONS

This application claims priority of Taiwan Patent Application No. 110149548, filed on Dec. 30, 2021, the entirety of which is incorporated by reference herein.

BACKGROUND OF THE INVENTION

Field of the Invention

The invention relates to a micro-controller chip, and more particularly to a micro-controller chip that accesses an external memory.

Description of the Related Art

With technological development, the types and functions of electronic devices have increased. The amount of program code performed by micro-controller chips in such electronic devices has increased. However, the memory space inside the micro-controller chip is not enough to store the program codes. Therefore, the micro-controller chip may store the program codes in an external memory. Since the external memory is disposed outside of the micro-controller chip, the program codes stored in the external memory may easily be stolen by a third party.

BRIEF SUMMARY OF THE INVENTION

In accordance with an embodiment of the disclosure, a micro-controller chip is coupled to an external memory and comprises a central processing unit (CPU), an address reorder circuit, and an address bus. The CPU is configured to provide a first internal address. The address reorder circuit calculates a unique identifier and a seed code to generate a base parameter and performs a reorder operation for the first internal address according to the base parameter to generate a first encryption address. The address bus is coupled between the address reorder circuit and the external memory to provide the first encryption address to the external memory. The external memory stores specific data according to the first encryption address.

In accordance with another embodiment of the disclosure, a micro-controller chip is coupled to an external memory and comprises an address protection circuit, a data protection circuit, an address bus, and a data bus. The address protection circuit encrypts an internal address to generate an encryption address. The data protection circuit encrypts internal data to generate encryption data. The address bus is configured to output the encryption address to the external memory. The data bus is configured to output the encryption data to the external memory.

In accordance with a further embodiment of the disclosure, an access method for a micro-controller chip coupled to an external memory, comprises reading a unique identifier of the micro-controller chip, calculating the unique identifier and a seed code to generate a base parameter, performing a reorder operation for a plurality of internal addresses according to the base parameter to generate a plurality of encryption addresses, and writing specific data to the external memory according to the encryption addresses. The external memory is disposed outside of the micro-controller chip.

Access methods may be practiced by a micro-controller chip which have hardware or firmware capable of performing particular functions and may take the form of program code embodied in a tangible media. When the program code is loaded into and executed by an electronic device, a processor, a computer or a machine, the electronic device, the processor, the computer or the machine becomes a micro-controller chip for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
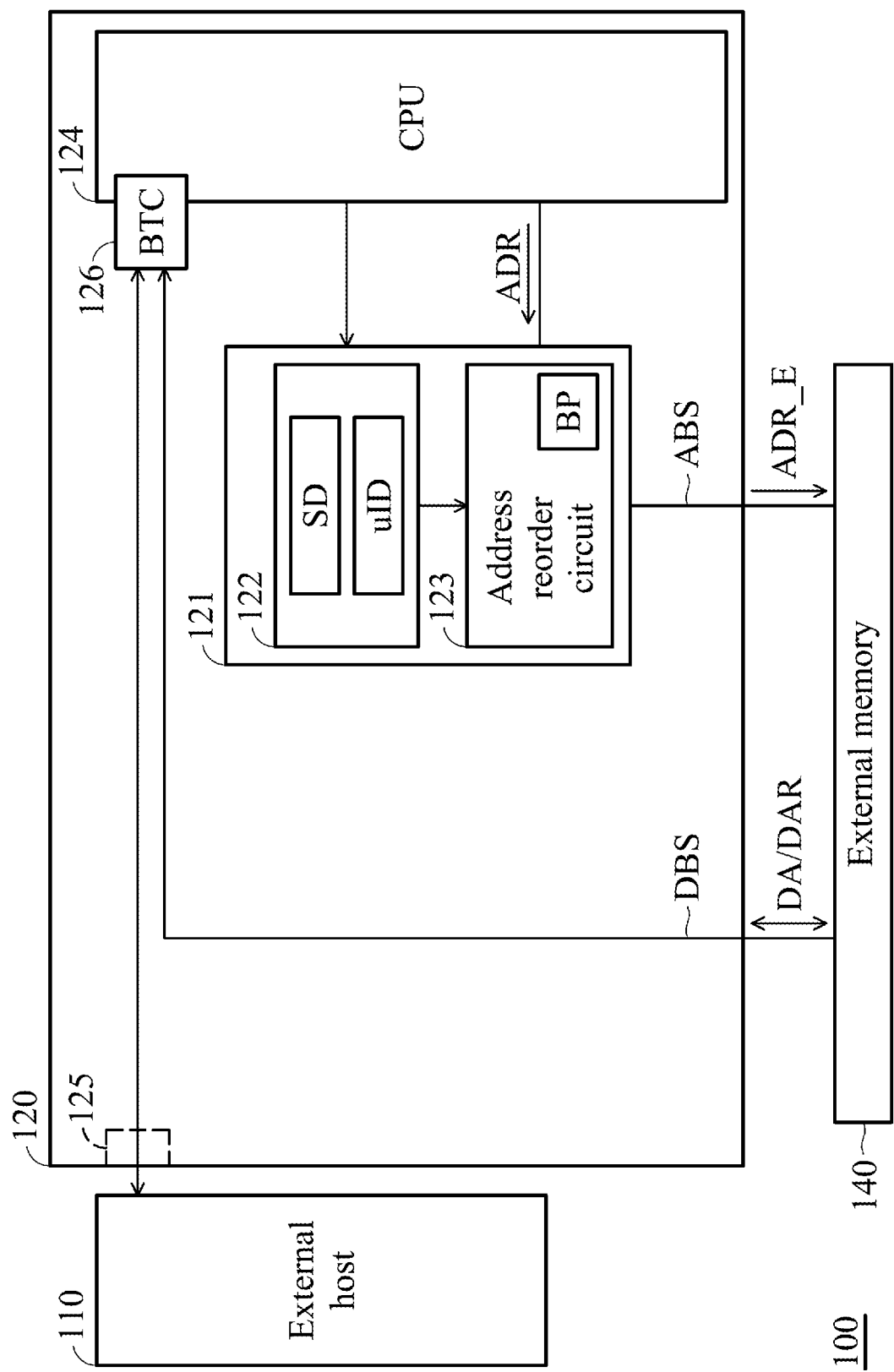
FIG. 1 is a schematic diagram of an exemplary embodiment of an access system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an access system according to various aspects of the present disclosure. The access system 100 comprises an external host 110, a micro-controller chip 120, and an external memory 140. In this embodiment, the external host 110 is disposed independent of the micro-controller chip 120 and the external memory 140, and the micro-controller chip 120 is disposed independent of the external memory 140. The external host 110 is configured to provide a firmware to the micro-controller chip 120. In one embodiment, the external host 110 is a firmware downloader tool.

The micro-controller chip 120 comprises an address protection circuit 121. The address protection circuit 121 encrypts an internal address ADR to generate an encryption address ADR_E. The present disclosure does not limit how the address protection circuit 121 encrypts the internal address ADR. In one embodiment, the address protection circuit 121 uses an algorithm to calculate a unique identifier uID and a seed code SD to generate a base parameter BP. The present disclosure does not limit how the address protection circuit 121 calculates the unique identifier uID and the seed code SD. In one embodiment, the address protection circuit 121 performs at least one of a XOR operation, a OR operation, an addition operation and a subtraction operation for the unique identifier uID and the seed code SD. In other embodiments, the unique identifier uID is the identification code of the micro-controller chip 120. In some embodiments, the seed code SD is provided by the external host 110.

In this embodiment, the address protection circuit 121 performs a reorder operation for the internal address ADR according to the base parameter BP to generate the encryption address ADR_E. For example, the internal address ADR may be 0000 1000. After the address protection circuit 121 transforms the internal address ADR, the encryption address ADR_E may be 0000 5000. In this case, the encryption address ADR_E is different from the internal address ADR.

The structure of the address protection circuit 121 is not limited in the present disclosure. In this embodiment, the address protection circuit 121 comprises an internal memory 122 and an address reorder circuit 123. The internal memory 122 is configured to store the unique identifier uID and the seed code SD. In some embodiment, the internal memory 122 is a non-volatile memory. The address reorder circuit 123 calculates the unique identifier uID and the seed code SD to generate base parameter BP and transforms the internal address ADR according to the base parameter BP to generate the encryption address ADR_E.

In one embodiment, the micro-controller chip 120 further comprises a central processing unit (CPU) 124. The CPU 124 provides the internal address ADR to the address reorder circuit 123. In another embodiment, the micro-controller chip 120 further comprises an input-output interface 125. The input-output interface 125 is configured to be coupled to the external host 110. The kind of input-output interface 125 is not limited in the present disclosure. In one embodiment, the input-output interface 125 is a universal serial bus (USB) interface.

The CPU 124 receives the seed code SD from the external host 110 via the input-output interface 125. In this case, the user may input the seed code SD to the external host 110. The CPU 124 stores the seed code SD in the internal memory 122. Since the address reorder circuit 123 encrypts the internal address ADR according to the base parameter BP and the base parameter BP is related to the seed code SD, the user can set the seed code SD to control the encryption operation and increase the resiliency of encryption operations.

In some embodiments, the micro-controller chip 120 further comprises an internal memory 126. The internal memory 126 is configured to store a boot code BTC. When the CPU 124 executes the boot code BTC, the CPU 124 generates internal data DA. In one embodiment, the internal memory 126 is a mask ROM. In this case, the boot code BTC is directly written into internal memory 126 during making the micro-controller chip 120. Therefore, the boot code BTC cannot be tampered. In another embodiment, the internal memory 126 is a flash memory. In this case, the internal memory 126 stores the boot code BTC provided by the external host 110.

In other embodiments, the micro-controller chip 120 further comprises an address bus ABS and a data bus DBS. The address bus ABS is coupled between the address reorder circuit 123 and the external memory 140 to output the encryption address ADR_E to the external memory 140. The data bus DBS is coupled between the CPU 124 and the external memory 140 to transmit internal data DA to the external memory 140. In one embodiment, the internal data DA is provided by the CPU 124. In such cases, after performing the boot code BTC, the CPU 124 provides the internal data DA to the data bus DBS.

The external memory 140 is a separate electronic component from the micro-controller chip 120 and coupled to the address bus ABS and the data bus DBS. When the external memory 140 receives a write command, the external memory 140 stores the internal data DA into the corresponding cells according to the address (e.g., the encryption address ADR_E) transmitted by the address bus ABS. When the external memory 140 receives a read command, the external memory 140 reads the corresponding cells according to the address (e.g., the encryption address ADR_E) transmitted by the address bus ABS to provide read data DAR. In some embodiments, the external memory 140 is a flash memory.

Since the external memory 140 is disposed outside of the micro-controller chip 120, the third party may be attempting to steal the data or the program code stored in the external memory 140. Therefore, the micro-controller chip 120 scatters the data such that the data stored in the external memory 140 is not easily stolen by the third party. In this embodiment, address protection circuit 121 utilizes the unique identifier uID of the micro-controller chip 120 and a seed code SD to encrypt the internal addresses. Since the different chips have different identification codes, the different address protection circuits 121 in the different chips generate different encryption addresses for the same internal address. Outsiders cannot predict where data will be stored so that possibility of data being stolen can be greatly reduced. Additionally, even if outsiders remove the external memory 140 and connect the external memory 140 to another chip, the chip cannot normally disassembly the program code stored in the external memory 140.

Figure 2:
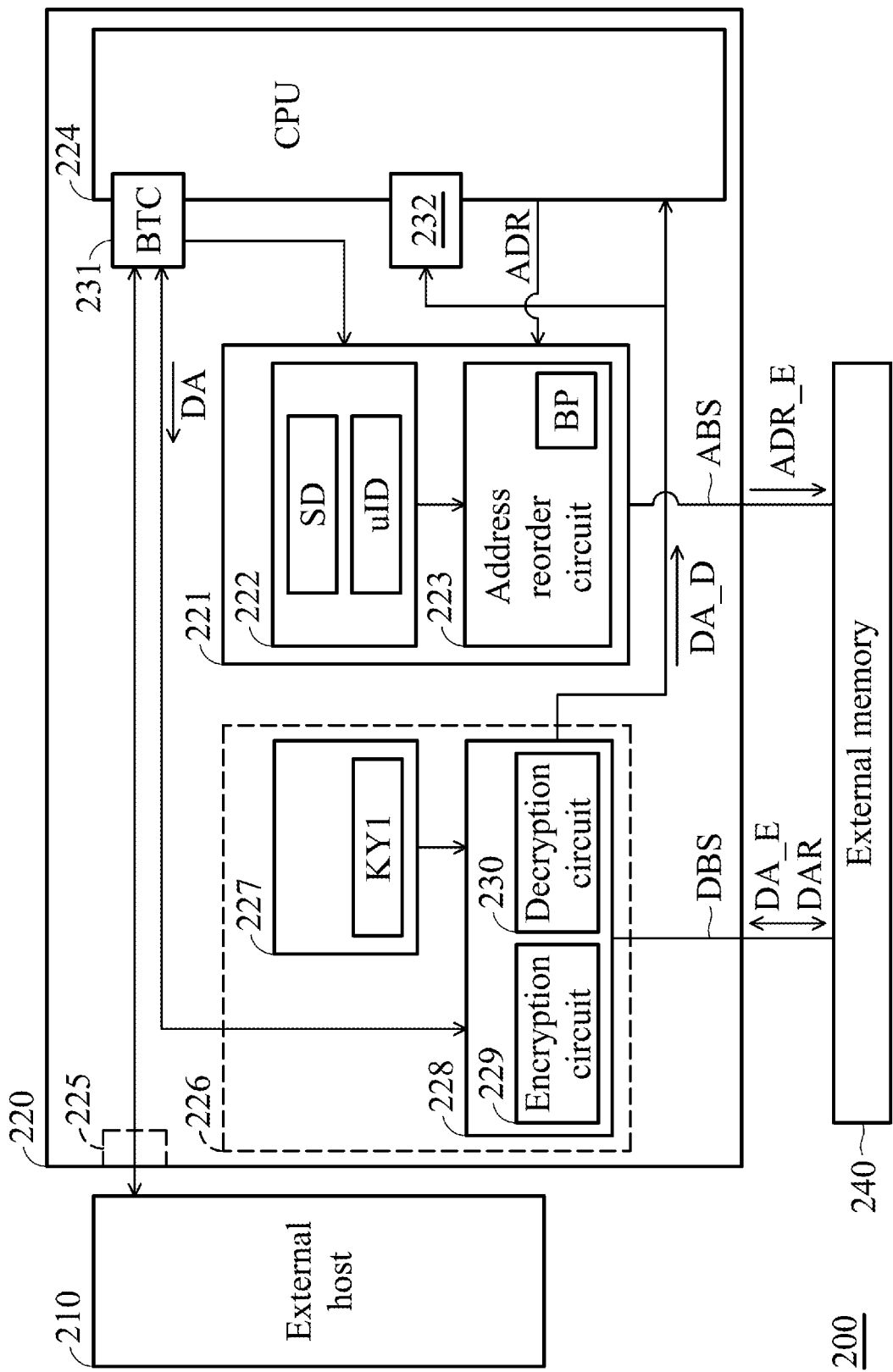
FIG. 2 is a schematic diagram of another exemplary embodiment of the access system according to various aspects of the present disclosure.

FIG. 2 is a schematic diagram of another exemplary embodiment of the access system according to various aspects of the present disclosure. The access system 200 comprises an external host 210, a micro-controller chip 220, and an external memory 240. Since the characteristics of the external host 210 and the external memory 240 shown in FIG. 2 are similar to the characteristics of the external host 110 and the external memory 140 shown in FIG. 1, the related description is omitted here. In this embodiment, the micro-controller chip 220 comprises an address protection circuit 221 and a data protection circuit 226. Since the characteristic of the address protection circuit 221 shown in FIG. 2 is similar to the characteristic of the address protection circuit 121 shown in FIG. 1, the related description is omitted here.

The data protection circuit 226 is coupled between the CPU 224 and the external memory 240 and operates in an encryption mode or a decryption mode. For example, when the data protection circuit 226 receives internal data DA, the data protection circuit 226 operates in an encryption mode. In the encryption mode, the data protection circuit 226 encrypts the internal data DA to generate encryption data DA_E. The present disclosure does not limit how the data protection circuit 226 encrypts the internal data DA. In one embodiment, the data protection circuit 226 processes the internal data DA according to a key KY1 to generate the encryption data DA_E.

In another embodiment, when the data protection circuit 226 receives read data DAR, the data protection circuit 226 operates in a decryption mode. In the decryption mode, the data protection circuit 226 decrypts the read data DAR to generate decryption data DA_D. The disclosure does not limit how the data protection circuit 226 decrypts the read data DAR. In one embodiment, the data protection circuit 226 processes the read data DAR according to the key KY1 to generate the decryption data DA_D.

The source of key KY1 is not limited in the present disclosure. In one embodiment, the key KY1 may be provided by the CPU 224. After performing the boot code BTC, the CPU 224 acquires the key KY1 and writes the key KY1 to the data protection circuit 226. In another embodiment, the key KY1 may be the base parameter BP. In such cases, after generating the base parameter BP, the address reorder circuit 223 provides the base parameter BP to the data protection circuit 226. The data protection circuit 226 provides the base parameter BP as the key KY1. In other embodiments, the key KY1 may be the same as the unique identifier uID or the seed code SD.

The external memory 240 receives the encryption address ADR_E via the address bus ABS and receives the encryption data DA_E or outputs the read data DAR via the data bus DBS. For example, when the external memory 240 receives a write command, the external memory 240 stores the encryption data DA_E to the corresponding cells according to the encryption address ADR_E. When the external memory 240 receives a read command, the external memory 240 reads the read data DAR corresponding to the encryption address ADR_E and outputs the read data DAR. Since the address and the data received by the external memory 240 are encrypted, the security of data stored in the external memory 240 can be greatly improved.

The structure of data protection circuit 226 is not limited in the present disclosure. In this embodiment, the data protection circuit 226 comprises an internal memory 227 and a cipher circuit 228. The internal memory 227 is configured to store the key KY1. The cipher circuit 228 is configured to perform an encryption operation and a decryption operation. In this embodiment, the cipher circuit 228 comprises an encryption circuit 229 and a decryption circuit 230. The encryption circuit 229 encrypts the internal data DA to provide the encryption data DA_E. The decryption circuit 230 decrypts the read data DAR to provide the decryption data DA_D.

In some embodiments, the micro-controller chip 220 further comprises an internal memory 232. In this case, when the internal address ADR sent from the CPU 224 points the internal memory 232, the data protection circuit 226 stores the decryption data DA_D to the internal memory 232. The kind of internal memory 232 is not limited in the present disclosure. In one embodiment, the internal memory 232 is a static random access memory (SRAM).

In another embodiment, the micro-controller chip 220 further comprises an internal memory 231. The internal memory 231 is configured to store the boot code BTC. In one embodiment, the CPU 224 receives the boot code BTC from the external host 210 via the input-output interface 225 and stores the boot code BTC to the internal memory 231. In some embodiments, when the CPU 224 executes the boot code BTC, the CPU 224 generates the internal data DA. The kind of internal memory 231 is not limited in the present disclosure. In one embodiment, the internal memory 231 is a non-volatile memory, such as a ROM.

Figure 3:
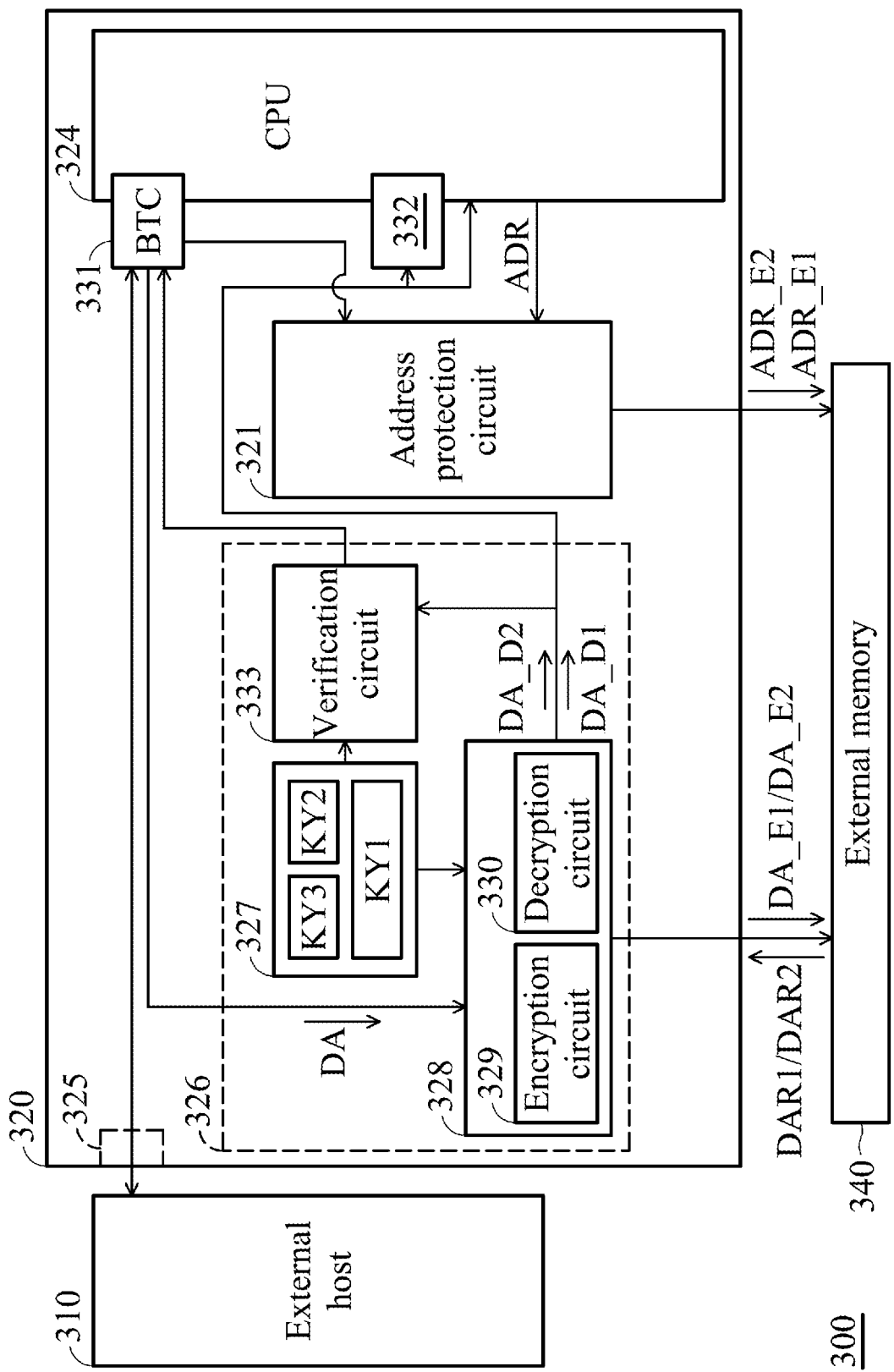
FIG. 3 is a schematic diagram of another exemplary embodiment of the access system according to various aspects of the present disclosure.

FIG. 3 is a schematic diagram of another exemplary embodiment of the access system according to various aspects of the present disclosure. The access system 300 comprises an external host 310, a micro-controller chip 320, and an external memory 340. Since the characteristics of the external host 310 and the external memory 340 shown in FIG. 3 are similar to the characteristics of the external host 110 and the external memory 140 shown in FIG. 1, the related description is omitted here. In this embodiment, the micro-controller chip 320 comprises an address protection circuit 321, a CPU 324, a data protection circuit 326, an input-output interface 325, internal memories 331 and 332. Since the characteristics of the address protection circuit 321, the CPU 324, the input-output interface 325, the internal memories 331 and 332 shown in FIG. 3 are similar to the characteristics of the address protection circuit 221, the CPU 224, the input-output interface 225, the internal memories 231 and 232 shown in FIG. 2, the related description is omitted here.

The data protection circuit 326 comprises an internal memory 327, a cipher circuit 328, and a verification circuit 333. The internal memory 327 stores the key KY1. The cipher circuit 328 uses the key KY1 to encrypt the internal data DA to generate the encryption data DA_E1. Since the characteristic of the cipher circuit 328 shown in FIG. 3 is similar to the characteristic of the cipher circuit 228 shown in FIG. 2, the related description is omitted here.

In order to identify whether the external memory 340 is a legitimate memory, the internal memory 327 further stores keys KY2 and KY3. The key KY2 represents predetermined data. The key KY3 represents a predetermined address. The external memory 340 stores the key KY2 to the corresponding cells according to the key KY3. When the micro-controller chip 320 is ready to access the external memory 340, the micro-controller chip 320 first reads the data in the external memory 340 according to the predetermined address and determines whether the data corresponding to the predetermined address is the same as the key KY2. If the data corresponding to the predetermined address is the same as the key KY2, it means that the external memory 340 is a legitimate memory. Therefore, the micro-controller chip 320 accesses the external memory 340 successively. If the data corresponding to the predetermined address is not the same as the key KY2, it means that the external memory 340 is not a legitimate memory. Therefore, the micro-controller chip 320 stops accessing the external memory 340. In one embodiment, the key KY2 is a signature, and the key KY3 is an offset.

In some embodiments, the address protection circuit 321 encrypts the key KY3 to generate the encryption address ADR_E2. In this case, the data protection circuit 326 encrypts the key KY2 to generate the encryption data DA_E2. The external memory 340 stores the encryption data DA_E2 to the corresponding cells according to the encryption address ADR_E2. When the CPU 324 is ready to access the external memory 340, the address protection circuit 321 reads the key KY3 to generate the encryption address ADR_E2. The external memory 340 outputs the read data DAR2 corresponding to the encryption address ADR_E2. The data protection circuit 326 decrypts the read data DAR2 to generate the decryption data DA_D2. The data protection circuit 326 determines whether the decryption data DA_D2 is the same as the key KY2. When the decryption data DA_D2 is the same as the key KY2, it means that the external memory 340 is a legitimate memory. Therefore, the CPU 324 starts to access the external memory 340. When the decryption data DA_D2 is different from the key KY2, it means that the external memory 340 is not a legitimate memory. Therefore, the CPU 324 does not access the external memory 340.

In this embodiment, the data protection circuit 326 further comprises a verification circuit 333. The verification circuit 333 determines whether the decryption data DA_D2 is the same as the key KY2. When the decryption data DA_D2 is the same as the key KY2, the verification circuit 333 writes a first set value to a specific cell of the internal memory 331. When the decryption data DA_D2 is not the same as the key KY2, the verification circuit 333 writes a second set value to the specific cell of the internal memory 331. The CPU 324 determines whether the external memory 340 is a legitimate memory according to the data (first set value or second set value) stored in the specific cell of the internal memory 331.

When the external memory 340 is a legitimate memory, the CPU 324 may enter a write mode. In the write mode, the CPU 324 sends an internal address ADR (referred to as a write address). The address protection circuit 321 encrypts the internal address ADR to generate an encryption address ADR_E1. At this time, the CPU 324 outputs the internal data DA (referred to as write data). The data protection circuit 326 encrypts the internal data DA to generate encryption data da_e1. The external memory 340 stores the internal data DA according to the encryption address ADR_E1. When the CPU 324 enters a read mode, the CPU 324 sends the internal address ADR (referred to as a read address). The address protection circuit 321 encrypts the internal address ADR to generate the encryption address ADR_E1. The external memory 340 reads the read data DAR1 corresponding to the encryption address ADR_E1. The data protection circuit 326 decrypts the read data DAR1 to generate the decryption data DA_D1 and provides the decryption data DA_D1 to the internal memory 332 and/or the CPU 324.

Figure 4:
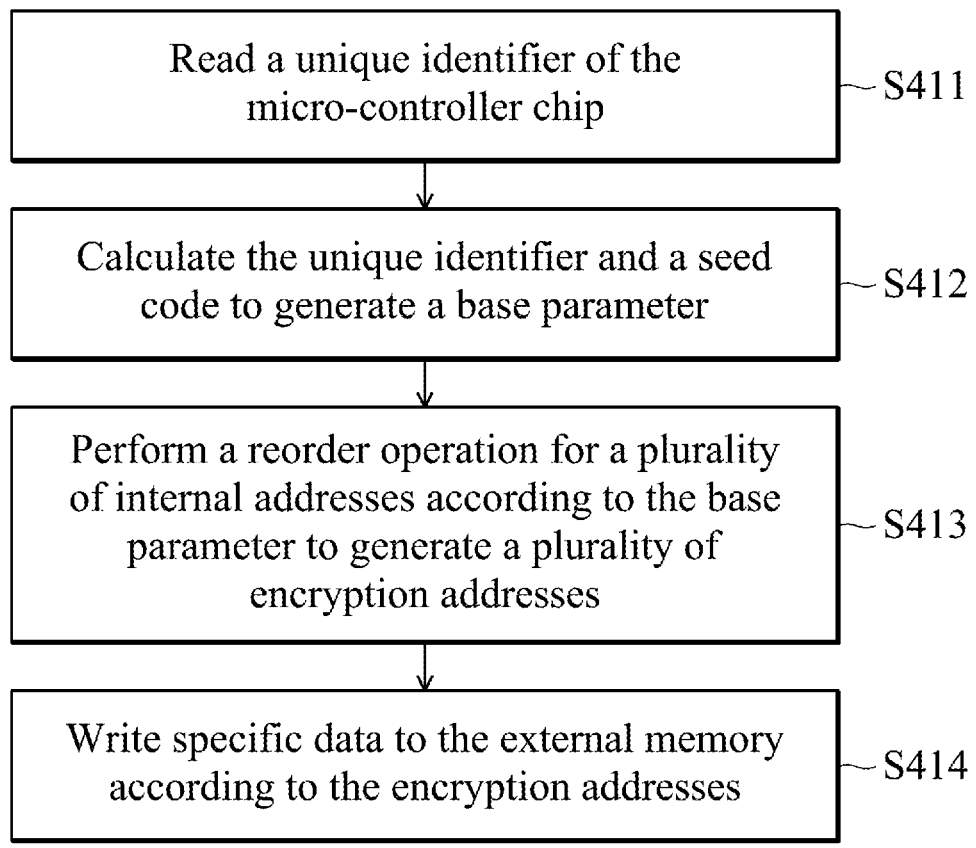
FIG. 4 is a flowchart of an exemplary embodiment of an access method according to various aspects of the present disclosure.

FIG. 4 is a flowchart of an exemplary embodiment of an access method according to various aspects of the present disclosure. The access method is applied to a micro-controller chip to access an external memory. In this embodiment, the external memory is a separate electronic component from the micro-controller chip. In one embodiment, the micro-controller chip may be the micro-controller chip 120 of FIG. 1, the micro-controller chip 220 of FIG. 2, or the micro-controller chip 320 of FIG. 3. First, a unique identifier of the micro-controller chip is read (step S411). Taking FIG. 1 as an example, the CPU 124 may store the unique identifier of the micro-controller chip in the internal memory 122.

Next, the unique identifier and a seed code are calculated to generate a base parameter (step S412). Taking FIG. 1 as an example, an address reorder circuit (e.g., 123) substitutes the unique identifier and the seed code into an expression to generate the base parameter BP. In one embodiment, the expression may comprise at least one of an XOR operation, a OR operation, an addition operation and a subtraction operation.

A reorder operation is performed for a plurality of internal addresses according to the base parameter to generate a plurality of encryption addresses (step S413). Taking FIG. 1 as an example, an address reorder circuit (e.g., 123) adjusts an internal address ADR to generate the encryption address ADR_E. In one embodiment, the address reorder circuit 123 calculates the base parameter BP and the internal address ADR according to another expression. In this case, the calculated result of the base parameter BP and the internal address ADR serves as the encryption address ADR_E. In some embodiments, the address reorder circuit 123 records the relationship between the internal addresses and the encryption addresses. Therefore, when the address reorder circuit 123 receives an internal address ADR, the address reorder circuit 123 uses a look-up table to find the corresponding encryption address. The address reorder circuit 123 does not need to re-calculate the base parameter BP and the internal address ADR.

Specific data is written to the external memory according to the encryption addresses (step S414). In one embodiment, the micro-controller chip comprises an address bus and a data bus. The external memory receives the encryption addresses via the address bus and receives the specific data via the data bus. In this case, the external memory stores the specific data in the corresponding cells according to the encryption addresses.

In other embodiments, the micro-controller chip further stores a boot code. In such cases, the micro-controller chip executes the boot code to generate the seed code. The source of the boot code is not limited in the present disclosure. In one embodiment, the boot code is provided by an external host. In this case, the micro-controller chip may comprise an input-output interface. The input-output interface is coupled to the external host. The external host is a separate electronic component from the micro-controller chip.

In some embodiments, before outputting the specific data to the external memory, the specific data has been encrypted. For example, the micro-controller chip utilizes a first key to encrypt first internal data to generate specific data. In this case, when the micro-controller chip reads the data stored in the external memory, the micro-controller chip first uses the first key to decrypt the data stored in the external memory to generate second internal data. the micro-controller chip stores the second internal data to an internal memory. The internal memory may be a SRAM.

In another embodiment, the micro-controller chip further stores a second key and a third key. The micro-controller chip performs the reorder operation for the third key according to the base parameter to generate a write address. The external memory stores the second key to the corresponding cells according to the write address. In this case, since the micro-controller chip does not encrypt the second key, when the micro-controller chip reads the second key stored in the external memory, the micro-controller chip does not need to decrypt the second key stored in the external memory. The micro-controller chip determines whether the second key stored in the external memory is the same as the second key stored in the micro-controller chip. When the second key stored in the external memory is the same as the second key stored in the micro-controller chip, it means that the external memory is a legitimate memory. When the second key stored in the external memory is not the same as the second key stored in the micro-controller chip, it means that the external memory is not a legitimate memory. Therefore, the micro-controller chip may stop accessing the external memory.

In another embodiment, the micro-controller chip encrypts the second key to generate an encryption key. In this case, the external memory stores the encryption key to the corresponding cells according to the write address. When the external memory receives a read command and the write address, the external memory outputs the encryption key. The micro-controller chip decrypts the encryption key to generate a decryption result. The micro-controller chip compares the decryption result and the second key. If the decryption result is the same as the second key, it means that the external memory is a legitimate memory. Therefore, the micro-controller chip still accesses the external memory. If the decryption result is different from the second key, it means that the external memory is not a legitimate memory. Therefore, the micro-controller chip stops accessing the external memory. In one embodiment, the second key is one of the unique identifier and the seed code, and the third key is the other of the unique identifier and the seed code.

It will be understood that when an element or layer is referred to as being "coupled to" another element or layer, it can be directly connected or coupled to the other element or layer or intervening elements or layers may be present. In contrast, when an element or layer is referred to as be "connected to" another element or layer, there are no intervening elements or layers present.

Access methods may take the form of a program code (i.e., executable instructions) embodied in tangible media, such as floppy diskettes, CD-ROMs, hard drives, or any other machine-readable storage medium, wherein, when the program code is loaded into and executed by a machine such as a computer, the machine thereby becomes a micro-controller chip for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a micro-controller chip for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro-controller chip coupled to an external memory, comprising:
   a central processing unit (CPU) configured to provide a first internal address;
   an address reorder circuit calculating a unique identifier and a seed code to generate a base parameter and performing a reorder operation for the first internal address according to the base parameter to generate a first encryption address; and
   an address bus coupled between the address reorder circuit and the external memory to provide the first encryption address to the external memory,
   wherein the external memory stores specific data according to the first encryption address.

2. The micro-controller chip as claimed in claim 1, further comprising:
   a first internal memory configured to store a boot code, wherein the CPU executes the boot code to generate the seed code.

3. The micro-controller chip as claimed in claim 2, further comprising:
   an input-output interface configured to be coupled to an external host,
   wherein the external host provides the boot code.

4. The micro-controller chip as claimed in claim 1, further comprising:
   a data bus coupled between the CPU and the external memory to provide the specific data to the external memory.

5. The micro-controller chip as claimed in claim 4, further comprising:
   a data protection circuit coupled between the CPU and the data bus and operating in an encryption mode or a decryption mode.

6. The micro-controller chip as claimed in claim 5, wherein:
   in response to the CPU providing first internal data, the data protection circuit operates in the encryption mode, and
   in the encryption mode, the data protection circuit encrypts the first internal data to generate the specific data and outputs the specific data to the external memory via the data bus.

7. The micro-controller chip as claimed in claim 6, wherein:
   in response to the external memory providing read data, the data protection circuit operates in the decryption mode, and
   in the decryption mode, the data protection circuit decrypts the read data to generate second internal data and provides the second internal data to the CPU.

8. The micro-controller chip as claimed in claim 7, wherein the data protection circuit comprises:
   a second internal memory storing a first key;
   a cipher circuit processing the first key and the first internal data to generate the specific data and processing the first key and the read data to generate the second internal data.

9. The micro-controller chip as claimed in claim 8, wherein the second internal memory further stores a second key and a third key, the address reorder circuit performs the reorder operation for the third key according to the base parameter to generate a second encryption address, and the external memory stores the second key according to the second encryption address.

10. The micro-controller chip as claimed in claim 9, wherein the data protection circuit further comprises:
    a verification circuit determining whether the second key stored in the external memory is the same as the second key stored in the second internal memory,
    wherein in response to the second key stored in the external memory being different from the second key stored in the second internal memory, the CPU stops accessing the external memory.

11. An access method for a micro-controller chip coupled to an external memory, comprising:
    reading a unique identifier of the micro-controller chip;
    calculating the unique identifier and a seed code to generate a base parameter;
    performing a reorder operation for a plurality of internal addresses according to the base parameter to generate a plurality of encryption addresses;
    writing specific data to the external memory according to the encryption addresses,
    wherein the external memory is disposed outside of the micro-controller chip.

12. The access method as claimed in claim 11, further comprising:
    storing a boot code; and
    executing the boot code to generate the seed code.

13. The access method as claimed in claim 12, wherein the boot code is provided by an external host which is disposed outside of the micro-controller.

14. The access method as claimed in claim 11, further comprising:

utilizing a first key to encrypt first internal data to generate the specific data;

utilizing the first key to decrypt read data to generate second internal data; and storing the second internal data in a memory which is disposed in the micro-controller, wherein the memory is a static random access memory.

15. The access method as claimed in claim 14, further comprising:

storing a second key and a third key;

performing the reorder operation for the third key according to the base parameter to generate a write address; and storing the second key in the external memory according to the write address.

16. The access method as claimed in claim 15, further comprising:

reading the external memory according to the write address to retrieve read data;

utilizing the first key to decrypt the read data to generate decryption data;

determining whether the decryption data is the same as the second key; and stopping the accessing of the external memory in response to the decryption data not being the same as the second key.

17. The access method as claimed in claim 15, wherein one of the unique identifier and the seed code serves as the second key, and the other of the unique identifier and the seed code serves as the third key.

18. A micro-controller chip coupled to an external memory, comprising:

an address protection circuit encrypting an internal address to generate an encryption address;

a data protection circuit encrypting internal data to generate encryption data;

an address bus configured to output the encryption address to the external memory; and a data bus configured to output the encryption data to the external memory.

19. The micro-controller chip as claimed in claim 18, wherein the address protection circuit calculates a unique identifier and a seed code to generate a base parameter and performs a reorder operation for the internal address to generate the encryption address.

20. The micro-controller chip as claimed in claim 18, wherein the data protection circuit processes the internal data according to a key to generate the encryption data.

* * * * *